United States Patent
Guidish

(10) Patent No.: US 9,803,346 B2
(45) Date of Patent: Oct. 31, 2017

(54) PASSIVE FLUID REGULATION SYSTEM

(71) Applicant: ACCURATE SITE DEVELOPMENT, INC., Naples, FL (US)

(72) Inventor: Jerome J. Guidish, Naples, FL (US)

(73) Assignee: Accurate Site Development, Inc., Naples, FL (US)

( * ) Notice: Subject to any disclaimer, the term of this patent is extended or adjusted under 35 U.S.C. 154(b) by 3 days.

(21) Appl. No.: 14/506,911

(22) Filed: Oct. 6, 2014

(65) Prior Publication Data
US 2016/0097464 A1   Apr. 7, 2016

(51) Int. Cl.
| | | |
|---|---|---|
| F16K 31/06 | (2006.01) |
| E03B 7/07 | (2006.01) |
| F17D 5/02 | (2006.01) |
| E03C 1/05 | (2006.01) |

(52) U.S. Cl.
CPC .............. *E03C 1/055* (2013.01); *E03B 7/071* (2013.01)

(58) Field of Classification Search
CPC . F16K 31/06; F17D 5/02; E03B 7/071; E03B 7/08; E03C 1/055
See application file for complete search history.

(56) References Cited

U.S. PATENT DOCUMENTS

| | | | | |
|---|---|---|---|---|
| 2,934,617 A | * | 4/1960 | Paxton | D06F 39/081 |
| | | | | 200/61.86 |
| 5,267,587 A | * | 12/1993 | Brown | E03B 7/071 |
| | | | | 137/486 |
| 5,347,264 A | * | 9/1994 | Bjorkman | F17D 5/00 |
| | | | | 137/487.5 |
| 5,539,384 A | | 7/1996 | Frasier | |
| 5,568,825 A | | 10/1996 | Faulk | |
| 5,881,755 A | * | 3/1999 | Dieringer | F17D 5/06 |
| | | | | 137/1 |
| 6,237,618 B1 | | 5/2001 | Kushner | |
| 6,532,979 B1 | * | 3/2003 | Richter | E03B 7/071 |
| | | | | 137/1 |

(Continued)

FOREIGN PATENT DOCUMENTS

| | | |
|---|---|---|
| DE | 29801828 U1 | 7/1998 |
| WO | WO 9914647 | 3/1999 |
| WO | 2010092380 | 8/2010 |

OTHER PUBLICATIONS

Refined Automation, Switched Water Shut-Off Control (available at www [dot] refinedautomation [dot] com/products/water/switch since at least as early as Jul. 28, 2014).

(Continued)

*Primary Examiner* — Seth W Mackay-Smith
(74) *Attorney, Agent, or Firm* — Cherskov Flaynik & Gurda, LLC

(57) ABSTRACT

The present invention provides a system for regulating fluid flow made up of a solenoid valve interposed on a fluid supply line; a light switch that controls a light; a transformer with a primary side and a secondary side, wherein the primary side is placed in intermediate electrical communication with the light switch and the light, wherein the secondary side is in electrical communication with the solenoid valve, and wherein the solenoid valve allows flow through the fluid supply line when the light switch is activated and prevents flow through the fluid supply line when the light switch is deactivated.

6 Claims, 5 Drawing Sheets

(56) References Cited

U.S. PATENT DOCUMENTS

| | | | |
|---|---|---|---|
| 6,708,722 B1 | 3/2004 | Goodenough | |
| 6,792,967 B1 | 9/2004 | Franklin | |
| 7,000,627 B1 | 2/2006 | Johnson | |
| 7,032,435 B2 | 4/2006 | Hassenflug | |
| 7,779,852 B2 | 8/2010 | Burlage et al. | |
| 8,534,313 B1 | 9/2013 | Achterman | |
| 2003/0024578 A1* | 2/2003 | Segal | E03B 7/071 137/613 |
| 2004/0007264 A1 | 1/2004 | Bootka | |
| 2005/0001186 A1* | 1/2005 | Therriault | E03C 1/057 251/129.04 |
| 2006/0162788 A1 | 7/2006 | Arigoni | |
| 2008/0087341 A1 | 4/2008 | Burlage et al. | |
| 2011/0248199 A1* | 10/2011 | Konovalski | E03B 7/08 251/129.15 |
| 2012/0174306 A1* | 7/2012 | Chen | E03C 1/057 4/304 |
| 2012/0273069 A1* | 11/2012 | Klicpera | B05B 12/004 137/551 |
| 2013/0248023 A1 | 9/2013 | Estrada, Jr. | |
| 2014/0224340 A1* | 8/2014 | Klee | E03B 7/071 137/1 |
| 2014/0224350 A1* | 8/2014 | Patel | E03B 7/071 137/78.1 |
| 2014/0238511 A1* | 8/2014 | Klicpera | F16K 31/02 137/551 |

OTHER PUBLICATIONS

Surestop Ltd., Product Range (available at www [dot] surestop [dot] co [dot] uk/data-page.asp?PID=16 since at least as early as Jul. 28, 2014.

* cited by examiner

PASSIVE FLUID REGULATION SYSTEM

BACKGROUND OF THE INVENTION

1. Field of the Invention

This invention is directed to a passive fluid regulation system, and more specifically this invention is related to fluid control to a fixture via operation of a light switch.

2. Background of the Invention

Many household and commercial devices are supplied with pressurized fluids for activities related to heating, cooling, cooking, and waste removal. Exemplary fluids include fuel products (oil, methane, propane), and cooking and waste removal agents (water and air).

Water is the most ubiquitous of these agents. A single family residence contains multiple sill cocks, faucets, weather exposed conduits and valves servicing standard fixtures, such as sinks, toilets, and washers. Water outlets are multiplied for large commercial accommodations, such as hotels, office buildings, commercial kitchens, restaurants, and trailer and RV parks.

Failure (leakage, freeze damage) of these fluid lines at a minimum results in substantial fluid loss. In worse case scenarios, substantial property damage or even loss of life occurs.

Toilets, faucets, showers, and other bathroom fixtures will all eventually leak. Toilets in particular develop slow leaks as a result of a damaged flapper, mineral buildup that prevents proper sealing, or a leaky water inlet valve.

In a standard toilet, the ballcock assembly controls the flow of water into the tank from a point of ingress at the bottom of the tank. The tank houses a float attached to the distal end of a lever. The proximal end of the lever is mechanically linked to a water inlet valve positioned between the proximal end of the lever and the ballcock valve. When the water level in the toilet tank rises to a certain height, the float pushes up on the distal end of the lever, which causes the proximal end to close the water inlet valve. When the water is below that height, the float does not provide a force on the distal end of the lever, and water is allowed to flow into the tank. If leaks exist in the tank or inlet valve, or if the toilet begins to overflow, water continues to flow into the tank and eventually spills over onto the floor. If the flapper valve does not seal completely, then the toilet tank cannot reach required the water level so that the water inlet valve closes, and the tank will continuously fill. Thus, leaks can cause a toilet to constantly fill and to potentially spew water.

Even for a single residential toilet, such leaks can waste several thousands of gallons of water a year. This can result in higher water bills or depleted well reserves. Additionally, wasting water has environmental impacts, especially in drought-ridden areas. These problems are further exacerbated in commercial or institutional settings where several toilets could simultaneously be affected.

The typical remedy for a slow leak in a toilet is to replace the damaged component. However, this only addresses the problem after the leak is detected. If the leak is in a toilet that is seldom or intermittently used, then it might avoid detection for a prolonged period of time. If the leak is detected early, then the water inlet valve can be shut off, but the user would have to open and close the valve before and after each and every use of the toilet. Such a situation is cumbersome, and at least some users are likely to forget to close the valve after use.

Some prior art devices have attempted to address the problem of leaks. For instance, some devices use timers to control the flow of water into a tank, others use flow meters, and still others use level sensors in the toilet bowl. However, these devices simply shutoff the water to the toilet until the leak can be remedied. The toilet cannot be used in the interim without manually overriding the system, and if the system is manually overridden, then the user must remember to reactivate it. Additionally, these systems are or use components that are relatively expensive.

Besides water lines, fuel lines, especially natural gas and liquefied petroleum gas, are commonly found in both residential and commercial settings for cooking and heating applications. A common concern among natural gas users is that the gas to the oven or stove has been left flowing. A natural gas stove can release gas even though no flame is present as long as a user actuated valve is not completely closed. Without the presence of a flame or the heat from combustion, the user might not even be aware of the leak. If the leak goes unchecked for an extended period of time, such as overnight, this could cause sickness or death from inhalation or possibly lead to an explosion. At the very least, it will cause an increase in the utility bill. Such concerns apply equally to those who use liquefied petroleum gas, liquid propane, and propane gas for domestic applications.

Sophisticated sensors can be used to detect fuel leaks when they occur. However, these sensors only identify the problem after it happens. In the interim, they do not mitigate the damages that occur. Furthermore, these sensors are expensive to implement and maintain.

Therefore, a need exists in the art for a system to regulate the flow of a fluid to a fixture such that leaks are unable to increase utility bills, deplete reserves, harm the environment, or cause a catastrophic failure. The system should require only standard "off the shelf" parts. The system should be easy to operate, and obvious to actuate.

SUMMARY OF THE INVENTION

An object of the present invention is to provide a fluid regulation system that overcomes many of the limitations of the prior art.

A further object of the present invention is to provide a fluid regulation system that mitigates the problems caused by leaks. A feature of the present invention is that the fluid regulation system prevents fluid from reaching the fixture. An advantage of the present invention is that even undetected leaks cannot cause a substantial increase in utility bills or cause a substantial depletion in reserves inasmuch as those undetected leaks are located downstream from where fluid shut off occurs. As such, actuation of the system is not dependent on the existence or detection of a leak or malfunction. Another advantage is that the leaks are prevented from reaching the point of causing substantial damage to persons or property.

Yet another object of the present invention is to provide a fluid regulation system that can work in a variety of applications. A feature of the present invention is that the system can be adapted to regulate, among other things, water flow to bathroom fixtures, either individually or to the entire bathroom, and to regulate fuel flow to residential and commercial applications, such as kitchen appliances. An advantage of the present invention is that safety is improved in those applications, while operational costs are reduced.

Another object of the present invention is to provide a fluid regulation system that is passive in nature. A feature of the present invention is that a pressurized fluid is made accessible to a fixture in a room when a light switch in the same room is actuated. An advantage of the present invention is that when a user enters a room, he or she will naturally turn on the lights, which will initiate supply of pressurized fluid to the fixture. When the user exits the room, he or she will naturally turn off the lights, thereby shutting off flow of pressurized fluid to the fixture.

An additional object of the present invention is to provide a fluid regulation system that is easy and safe to install. A feature of the present invention is that the present invention is considered a low voltage Class 2 circuit, which operates at lower energy and improves fire safety. An advantage of the present invention is that the components are all Underwriters Laboratories (UL®) listed and readily available commercially. Another advantage of the present invention is that the components are relatively inexpensive compared to other fluid regulation devices.

Briefly, the present invention provides a system for regulating fluid flow, the system comprising a solenoid valve in fluid communication with, and regulating flow in a fluid supply line; a light switch that controls a light; and a transformer with a primary side and a secondary side, wherein the primary side is placed in intermediate electrical communication with the light switch and the light, wherein the secondary side is in electrical communication with the solenoid valve, and wherein the solenoid valve allows flow through the fluid supply line when the light switch is activated and prevents flow through the fluid supply line when the light switch is deactivated.

The present invention also provides a system to regulate fluid flow, the system comprising a solenoid valve in fluid communication with, and regulating flow in, a fluid supply line; a motion-activated switch; and a transformer with a primary side and a secondary side, wherein the primary side is placed in electrical communication with the motion activated switch and the secondary side is in electrical communication with the solenoid valve, and wherein the solenoid valve allows flow through the fluid supply line when the motion activated switch is actuated and prevents flow through the fluid supply line when the motion activated switch is not triggered.

The present invention further provides a system to regulate fluid flow, the system comprising a plurality of solenoid valves interposed on a plurality of fluid supply lines; a light switch that controls a light; and a transformer with a primary side and a secondary side, wherein the primary side is placed in intermediate electrical communication with the light switch and the light, wherein the secondary side has a plurality of windings in electrical communication with the plurality of solenoid valves such that each of the plurality of solenoid valves is connected to its own winding, and wherein each solenoid valve allows flow through its respective fluid supply line when the light switch is activated and prevents flow through its respective fluid supply line when the light switch is deactivated.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
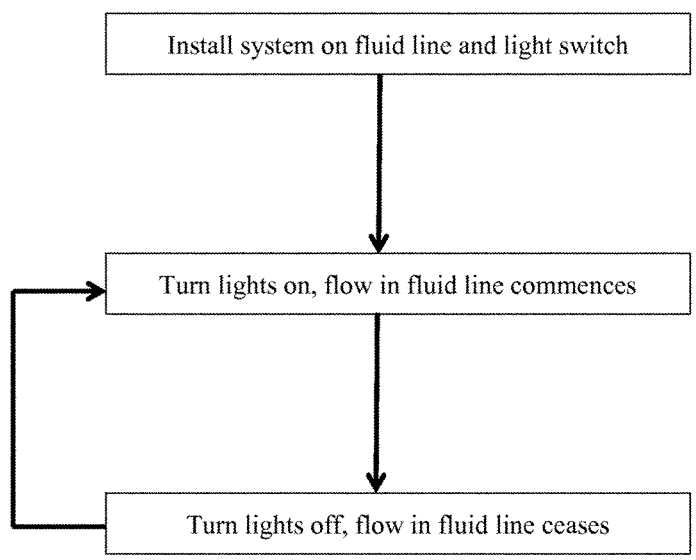
FIG. 1 is a process flow chart describing the general operation of the present invention.
Figure 2:
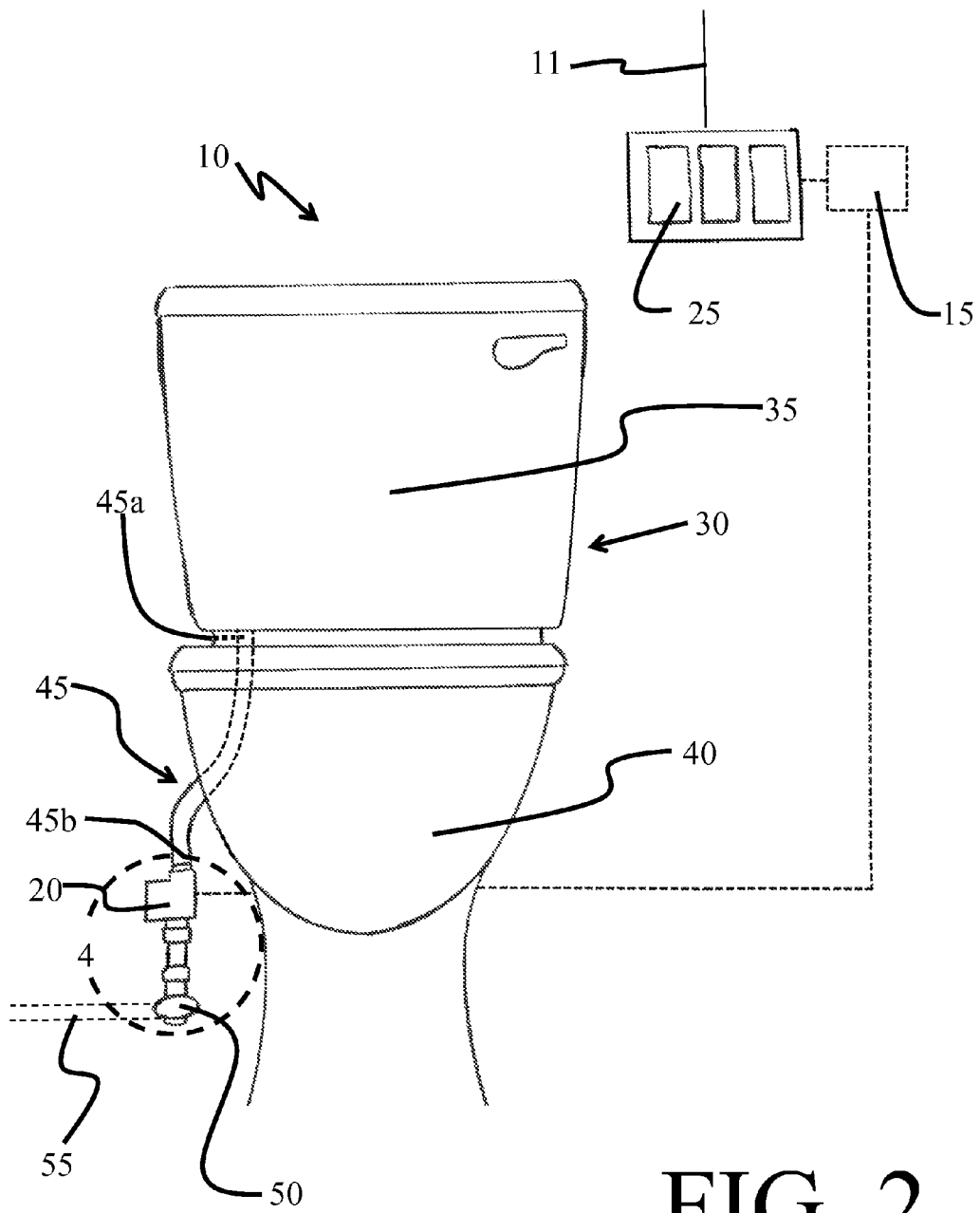
FIG. 2 is a diagram of the fluid regulation system, in accordance with the features of the present invention.

The present invention is directed to a passive fluid regulation system, designated as numeral 10 in FIG. 2. The system 10 is placed downstream and in fluid communication with a fluid line 55 that leads to a fixture such that the system is positioned upstream of the fixture. The system 10 is normally in the closed position, i.e., it prevents the flow of fluid in the fluid line. When the system 10 is activated, it changes to the open position, allowing the flow of fluid within the line. In a preferred embodiment of the present invention, the system 10 is activated by a light switch. The light switch controls the lights to the room containing the fixture and also the flow of fluid in the fluid line. A particular fixture that could benefit greatly from the invented system 10 is a toilet. The following description and figures will relate to the invented system's application to a toilet, but other uses are also envisioned.

Figure 3:
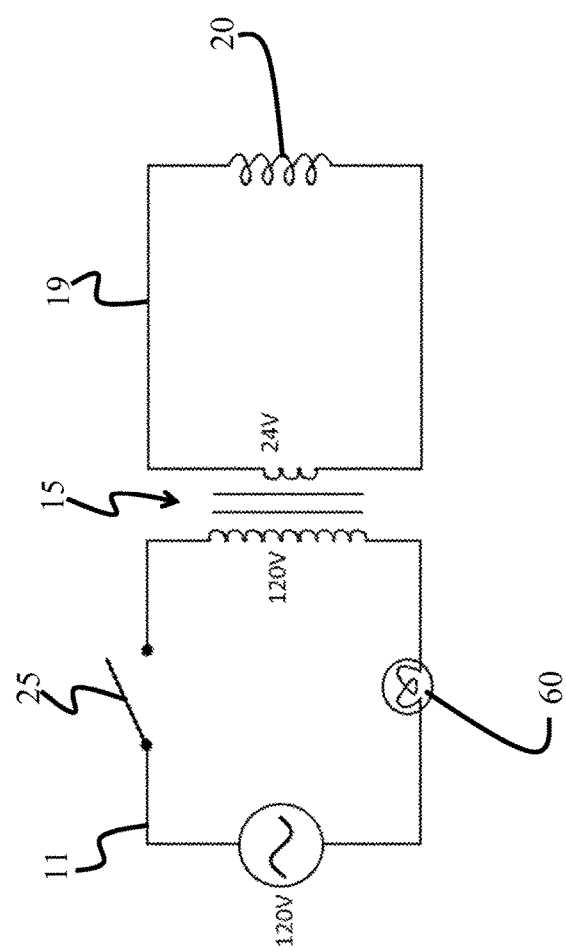
FIG. 3 is a schematic of the electric circuit, in accordance with the features of the present invention.

FIGS. 2 and 3 show the general arrangement of the fluid regulating system 10. The system primarily consists of a transformer 15 which steps down household AC voltage to a lower voltage. A rectifier or a rectifier and smoothing filter could be used in combination with the transformer 15 such that the household AC voltage and current are transformed to DC current. The transformer 15 is in electrical communication with a light switch 25, such that the switch is energized by the 120 V circuit. The transformer is further in electrical communication, via a low-voltage line 19 with a solenoid valve 20. The transformer 15 is shown in phantom in FIG. 2 because it is preferably placed behind the wall for electrical insulation, safety, and aesthetic reasons. The solenoid valve 20 controls water flow to a fixture, such as a toilet 30, in one embodiment. The toilet 30 consists of a tank 35 and a bowl 40, in the depicted embodiment. The tank 35 is supplied with water via an inlet line 45. The inlet line 45 is typically a flexible conduit made from plastic, rubber, or braided metal strands, that inlet line positioned downstream of the solenoid valve 20. A first end 45a of the inlet line 45 typically features a threaded connector that attaches to the ballcock assembly in the toilet tank 35. A second end 45b of the inlet line 45 connects to the solenoid valve 20. The solenoid valve 20 is in fluid communication with a water shutoff valve 50, which in turn is in fluid communication with a premises supply line 55.

In a standard toilet 30, the water shutoff valve 50 is normally in the open position such that water from the supply line 55 can flow into the tank 35. By placing the solenoid valve 20 intermediate of the water shutoff valve 50 and the fluid inlet line 45, the solenoid valve 20 instead regulates flow of water into the tank 35. The solenoid valve 20 is normally in the closed position such that water cannot flow through it. Therefore, the solenoid valve 20 must be activated to allow flow. However, if the toilet tank 35 is already full, then flow will not commence inasmuch as the ball valve within the tank prevents additional water from entering the tank.

Activation of the solenoid valve 20, thereby opening or closing the flow, is controlled by the light switch 25 via the transformer 15. In an unpowered state, the solenoid valve 20 is in a closed position, preventing flow from the supply line 55 to the toilet fixture 40.

FIG. 3 shows the schematic diagram of the solenoid circuit. In the United States, a standard light switch carries a standard voltage of 120V AC. The light switch 25 is connected in series to the primary side of the transformer 15. The transformer 15 is then connected in series to a light 60. In this way, turning the lights on will activate the transformer as well. The transformer 15 steps down the voltage on the secondary side to a lower level, such as 12 V or 24 V AC. When the light switch 25 is activated, current flows through the primary side of the transformer 15 and through the light 60. On the secondary side of the transformer 15, the flow is through a low-voltage solenoid valve 20. The normally closed solenoid 20 is actuated to the open position, allowing the flow of water. When the light switch is turned off, current flow through the transformer 15 and light 60 stops, and the solenoid valve 20 returns to the closed position.

In an embodiment of the invention, the components for the system are substantially all UL® listed and commercially available. A suitable transformer 15 is model 125C-A, manufactured by Heath Zenith (Bowling Green, Ky.). To connect to the home or building power supply, the transformer has three primary side connections: hot, neutral, and ground. It also has three secondary side connections for 8, 10, and 24 V AC connections. An embodiment of the solenoid valve is a ¾" 2BCV Series 24 VAC solenoid available from WIC Valve (San Jose, Calif.). Suitable wire for use with the present invention is 18 AWG 3 wire made by Alan Wire (Sikeston, Mo.).

These components are all Class 2 components under the National Electrical Code®, produced by the National Fire Protection Association. This code has largely been adopted by most state and local jurisdictions. Class 2 circuits are considered low voltage circuits, having a circuit voltage less than 30 V AC. Class 2 circuits are considered to be safer than Class 1 circuits from a fire prevention and electric shock standpoint. Class 2 circuits are also less expensive to install. Thus, designing the presently invented system 10 to be class 2 compliant offers several of the above identified cost and safety advantages.

Figure 4:
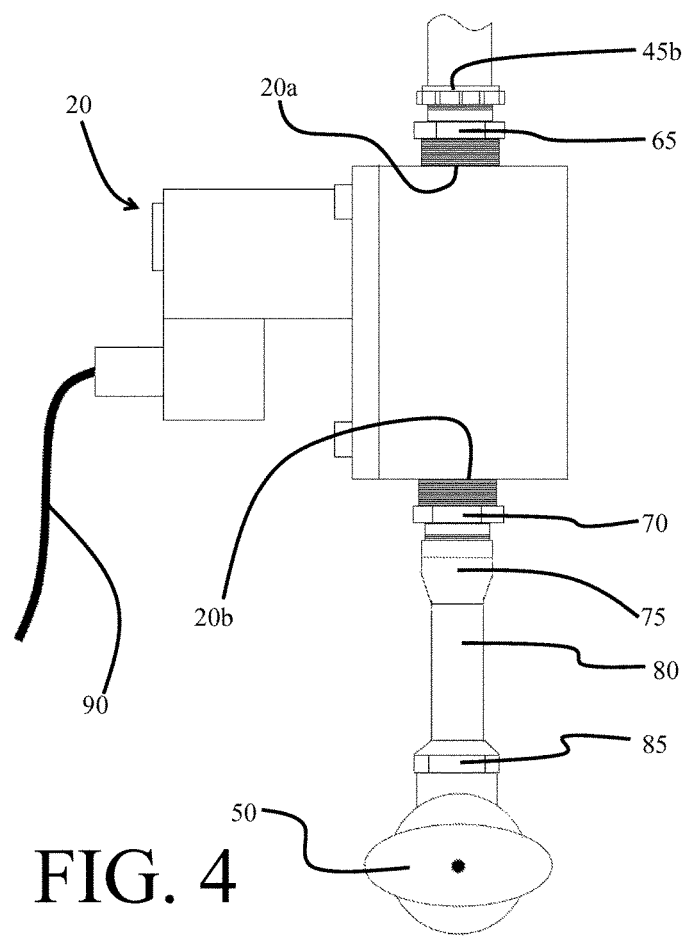
FIG. 4 is a detailed view of the solenoid valve as shown in FIG. 1.

FIG. 4 shows the solenoid valve 20 adapted to an existing toilet's plumbing. On the downstream end 20a of the solenoid valve 20, a male-male connector 65 reduces the connection from the ¾" solenoid valve 20 to the ½" second end 45b of the inlet line 45. On the upstream end, a male-male ¾" to ½" connector 70, a flared fitting 75, a small section of conduit such as copper pipe 80, and a ⅜" compression fitting 85 connect the solenoid valve 20 to the water shutoff valve 50. Thread seal tape, or other thread sealants, can optionally be used to ensure that the fittings do not leak. A two-wire electrically conductive cable 90 connects the solenoid valve 20 to the transformer 15; however, three-wire cable could also be used to ground the solenoid. Preferably, the cable 90 is concealed (e.g., behind a wall or ceiling panel) for aesthetic reasons.

The system 10 is described as "passive" because it does not have to be intentionally controlled or actuated by a bathroom entrant. For example, a person using the restroom would naturally turn the lights on when he or she enters. This action starts the flow of water to the toilet tank. When the person leaves the restroom, he or she will then turn the lights off, thereby ceasing the flow of water to the toilet tank. In this way, the user does not have to take action independent of what he or she would normally do under the circumstances. Nevertheless, the system is still saving water.

In some instances, users will forget to turn the lights off. Even in those circumstances, the system will still save more water than would ordinarily be saved because the lights will eventually be turned off, such as during the overnight hours.

In one embodiment of the system, the light switch is replaced with a motion activated switch. Motion activated switches typically use an infrared sensor to detect a change in temperature, such as when a person walks by. The switch will then turn itself off after a preset amount of time. Thus, in this embodiment, current flow through the system does not require the user to physically flip a switch upon entering the room. Instead, simply walking into the room will activate the system. This design is especially applicable to rooms that are well-lit during the daylight hours, such that a person entering the room might not turn the lights on.

The motion activated switch can be connected to a light or the switch can operate independently of the main room light. Alternatively, the motion activated switch can activate a secondary light, such as a ground level night light. Some people prefer to avoid turning on the lights upon waking up in the night to use the restroom or get a drink of water. Using a motion activated switch to turn on the water in the restroom and a ground level night light would help prevent falls, while also avoiding the shock of bright lights during a brief moment of being awake.

In another embodiment, the transformer 15 has multiple windings on the secondary side such that a plurality of solenoids can be connected to the transformer 15. For instance, if the secondary side of the transformer had five 24V windings, then flow to the hot and cold lines of a faucet, the hot and cold lines of a shower, and the inlet line for a toilet could all be tied to operation of a light switch 25. When the light switch 25 is "on," then flow to each fixture would be allowed. When the light switch 25 is "off," flow to all of the fixtures would be shut off. In this way, flow of water to all of the water fixtures in a room could be regulated simultaneously.

Figure 5:
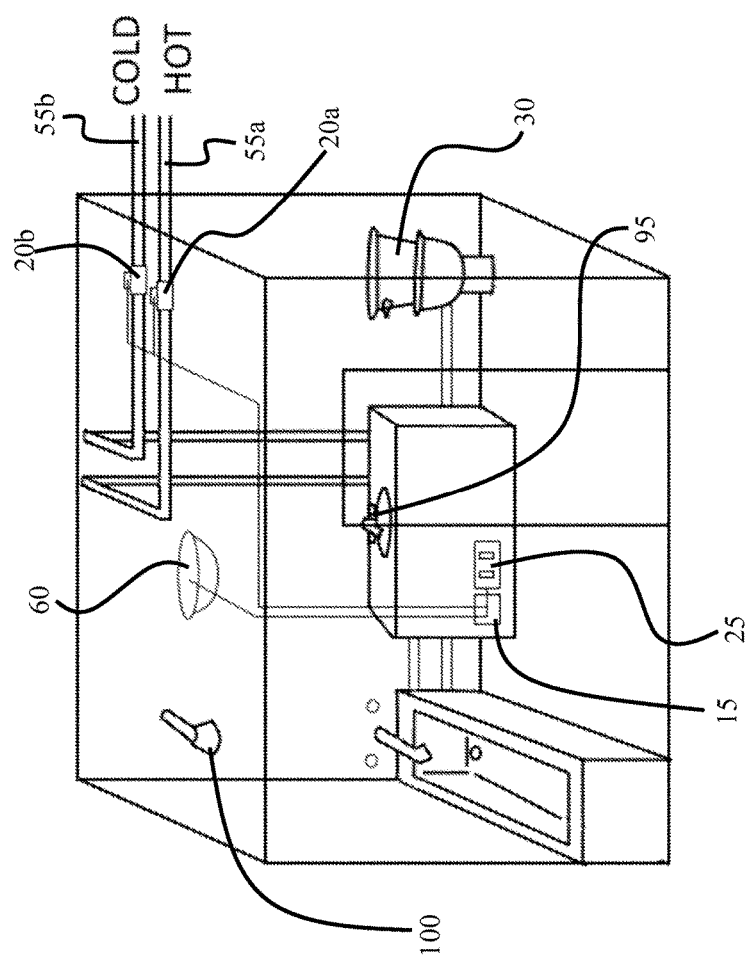
FIG. 5 is a view of an entire bathroom regulated with the present invention.

Alternatively, as depicted in FIG. 5, the flow of water to all of the fixtures in a room can be regulated by placing the solenoid valve on the supply lines entering the room. FIG. 5 shows a hot water supply line 55a and a cold water supply line 55b entering a restroom. The supply lines 55a and 55b are located in the ceiling in this depiction, but they could also be located in the walls or floor joists depending on the construction of the house. The hot water supply line 55a runs to a sink faucet 95 and shower 100, while the cold water supply line runs to the sink faucet 95, shower 100, and toilet 30. A first solenoid valve 20a and a second solenoid valve 20b are interposed on the hot water supply line 55a and the cold water supply line 55b, respectively. The solenoid valves 20a, 20b are in electrical communication with the transformer 15, which is connected in series with the light switch 25 and the light 60.

When the light 60 in the bathroom is off, the solenoid valves 20a, 20b block the flow of water on the supply lines 55a, 55b, thereby preventing water from reaching the bathroom fixtures. When the light 60 is turned on, water flow is allowed to reach the bathroom fixtures. Accordingly, this embodiment provides the same benefit as installing a solenoid valve on each fixture; however, this embodiment provides the additional advantage that the components can be completely hidden in the ceiling, floor, or wall and reduces the number of installations. The size of the valve that is needed can vary depending on the size of the water pipe running through the home, which can typically vary from one half inch to one inch. The valve for the hot water line should be capable of operating at temperatures of up to 140° F., which is typically the hottest temperature at which water is stored. More commonly, the water in the hot water line will be below 130° F. so as to avoid scalds.

The embodiment described in FIG. 5 could also be applied to fuel lines in a kitchen. In this configuration, the solenoid valve would be placed on the gas line entering the kitchen. This configuration applies especially well to commercial kitchens. When the kitchen in a restaurant, bakery, or hotel is closed and the employees leave, the lights are typically shutoff in the kitchen. In doing so, the gas supplied to the kitchen equipment would also be shut off by the solenoid valve on the gas mainline. The worker who shuts the lights off in the kitchen may not even know or realize that he or she is also shutting off the gas to supply.

The system 10 has particular applicability for rental homes, hotels, vacation homes, and other places that are or could be intermittently used. Rental homes and vacation homes, especially, often go through periods of prolonged disuse. Prior to leaving, most people make a point to shut off all the lights in the home; however, most people do not think to shut off the water or fuel supply. Use of the invented system 10 will ensure that shutting off the lights will also protect against leaks in water fixtures and the accumulation of fuel gas in the home. In a particular embodiment, the pipes that are shutoff are wrapped in heat tape or another insulating material, so as to help prevent the pipes from freezing during prolonged shutoff over the winter months. These measures save money and avoid potential dangerous situations.

In hotels, after a guest leaves, the guest or cleaning service will usually shut off all of the lights in the room. Moreover, in some European hotels, the guest must insert a keycard into a slot to turn on the lights. Such a system could easily be modified to also energize a solenoid to allow flow to the bathroom. Again, use of the invented system in these circumstances will prevent slow leaks in the water fixtures from turning into large expenses on the water bill.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

An exclusive property right or privilege is claimed in the invention as defined by the following claims:

1. A passive system to regulate fluid flow, said system consisting of:
   a solenoid operated valve placed in fluid communication with a fluid line wherein said fluid line leads to a single water fixture in a room and wherein said solenoid operated valve is placed upstream of the single water fixture;
   a transformer in electrical communication with a light switch a household alternating current source wherein said light switch controls a light source in the same room as the single fixture, wherein said transformer changes the household alternating current source to a low voltage current; and
   a low voltage line connecting said solenoid operated valve and said transformer such that while the transformer is energized, the solenoid operated valve is open and wherein said transformer is energized only when the light switch is on in said room and the light source is on.

2. The passive system to regulate fluid flow of claim 1, wherein said solenoid-operated valve is closed when the light switch is turned off and the transformer is not energized.

3. The passive system to regulate fluid flow of claim 1, wherein said switch interrupts the household alternating current source, and wherein once energized said transformer provides the low voltage line 24 V which is used to operate the solenoid operated valve.

4. The passive system to regulate fluid flow of claim 1, wherein said switch interrupts an alternating current source having 120 V, and wherein once energized said transformer provides the low voltage line 12 V which is used to operate the solenoid operated valve.

5. The passive system to regulate fluid flow of claim 1, wherein the light source in the sole light source in the room.

6. The passive system to regulate fluid flow of claim 1, wherein said water fixture comprises a toilet.

* * * * *